United States Patent [19]
Christian

[11] Patent Number: 5,806,206
[45] Date of Patent: Sep. 15, 1998

[54] GAS DISTRIBUTOR FOR VERTICAL GAS/ SOLID REACTORS

[75] Inventor: Joel B. Christian, Towanda, Pa.

[73] Assignee: Osram Sylvania Inc., Danvers, Mass.

[21] Appl. No.: 916,381

[22] Filed: Aug. 22, 1997

[51] Int. Cl.[6] .................................................. F26B 17/00
[52] U.S. Cl. ........................................................... 34/585
[58] Field of Search ............................. 34/576, 577, 579, 34/582, 585, 587, 84, 135, 136, 137, 168, 182, 195, 222; 138/42, 45, 46

[56] References Cited

U.S. PATENT DOCUMENTS

| | | | |
|---|---|---|---|
| 4,068,389 | 1/1978 | Staffin et al. | 34/57 A |
| 4,371,115 | 2/1983 | Sedlacek et al. | 34/585 X |
| 4,628,868 | 12/1986 | Eaton | 34/585 |
| 5,101,576 | 4/1992 | Abdulally | 34/585 |

*Primary Examiner*—Henry A. Bennett
*Assistant Examiner*—Steve Gravini
*Attorney, Agent, or Firm*—Robert F. Clark

[57] ABSTRACT

A rugged, adjustable gas distributor for vertical gas/solid fluidized bed reactors. The openings in the gas distributor containing axially positionable bolt assemblies which may be alternately loosened or tightened to regulate gas flow into the fluidizing chamber without having to empty the reactor.

7 Claims, 3 Drawing Sheets

GAS DISTRIBUTOR FOR VERTICAL GAS/SOLID REACTORS

TECHNICAL FIELD

This invention relates to fluidized bed reactors. More particularly, this invention relates to gas distributor plates used in fluidized bed reactors.

BACKGROUND ART

Fluidized bed reactors are generally described in U.S. Pat. No. 4,068,389 which is incorporated herein by reference. In general, fluidized beds are generated by flowing a gas through a particulate solid. When the momentum of the gas becomes sufficient to overcome the weight of particles, the particles begin to float and the mass of particles begins to behave as a liquid. The fluidizing gas may be inert or may function as a reactant in which case the reactor may be heated to promote reaction with the gas. A key component of any fluidized bed reactor is the gas distributor plate which disperses and regulates the flow of gas into the fluidizing chamber containing the particulate solid. Uniform dispersion of the gas into the fluidizing chamber is important to maintain fluidization of the entire bed and to promote homogeneous reactions within the bed.

The gas distributor in a vertical gas/solid reactor generally consists of a horizontal plate which forms the base of the fluidizing chamber containing the particulate solid and the top of the plenum chamber containing the pressurized gas. The distributor plate is coextensive with the walls of the reactor and has a number of systematically spaced openings to permit the pressurized gas in the plenum chamber to flow into the fluidizing chamber. These openings may exist in the form of porous ceramic or metal frits, bubble caps, or simply small holes. However, these types of configurations have various disadvantages. For example, porous frits may become clogged with small particulates; bubble caps tend to be less rugged and are more susceptible to wearing when refractory metals are being fluidized; and, perforated plates allow particulates to fall down into the plenum chamber. U.S. Pat. No. 4,068,389 attempts to overcome these disadvantages by using oversized threaded openings into which threaded studs are inserted. However, fine particulates may become lodged in the threads obstructing the gas flow and binding the studs. This problem can become acute when fluidizing a lubricant such as molybdenum disulfide. Furthermore, in order to adjust the studs to regulate the gas flow, it is necessary to empty the fluidizing chamber to gain access to the studs. An additional problem arises when a mechanical agitator is used to mix the solids. Depending on the rotation direction of the agitator and powder relative the threads on the studs, the studs can be loosened or tightened thereby changing the gas dispersion.

SUMMARY OF THE INVENTION

It is an object of the invention to obviate the disadvantages of the prior art.

It is another object of the invention to provide a gas distributor which is adjustable without having to remove the contents of the fluidizing chamber.

It is a further object of the invention to provide a gas distributor which is less susceptible to clogging and wear.

In accordance with one aspect the invention, there is provided a gas distributor for a vertical gas/solid fluidized bed reactor, said fluidized bed reactor having a fluidizing chamber for fluidizing particulate solids and a plenum chamber for receiving a pressurized gas, said gas distributor comprising: a plate having at least one opening therethrough, an upward face in contact with said fluidizing chamber and a downward face in contact with said plenum chamber, said plate being horizontally disposed between said fluidizing chamber and said plenum chamber; and an axially positionable bolt assembly situated in each opening, said bolt assembly comprising a bolt and a fastener, said bolt having a head, a threaded shaft and a retaining shoulder, said head protruding into said fluidizing chamber and being wide enough to occlude said opening, said retaining shoulder being proximate to said head and extending axially and outwardly from said shaft, said threaded shaft protruding into said plenum chamber, said fastener being connected to said threaded shaft for engaging the downward face of said plate; and, each opening having complementary surfaces for contacting said retaining shoulder to inhibit axial rotation of said bolt, said complementary surfaces being spaced apart from said shoulder to permit gas to flow therebetween and to allow axial translation of said bolt assembly.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

This invention provides a gas distributor plate having a gas regulating means in the form of axially positionable bolts situated within the openings in the gas distributor plate. The head of each bolt protrudes into the fluidizing chamber and covers the opening to prevent particulates from entering the opening. The opposite end of the bolt extends below the gas distributor plate into the plenum chamber. A fastener is attached to the opposite end to hold the bolt within the opening. A means is provided whereby axial rotation of the bolt is inhibited so that the fastener can be alternately tightened or loosened thereby regulating the flow of gas through the opening. The preferred bolt assembly is a standard carriage bolt and nut. Access through the plenum chamber is provided for adjusting the fasteners. This rugged configuration is capable of being used for fluidizing abrasive materials such as refractory metals, is less susceptible to clogging and wear, and is adjustable without having to empty the fluidizing chamber.

Figure 1:
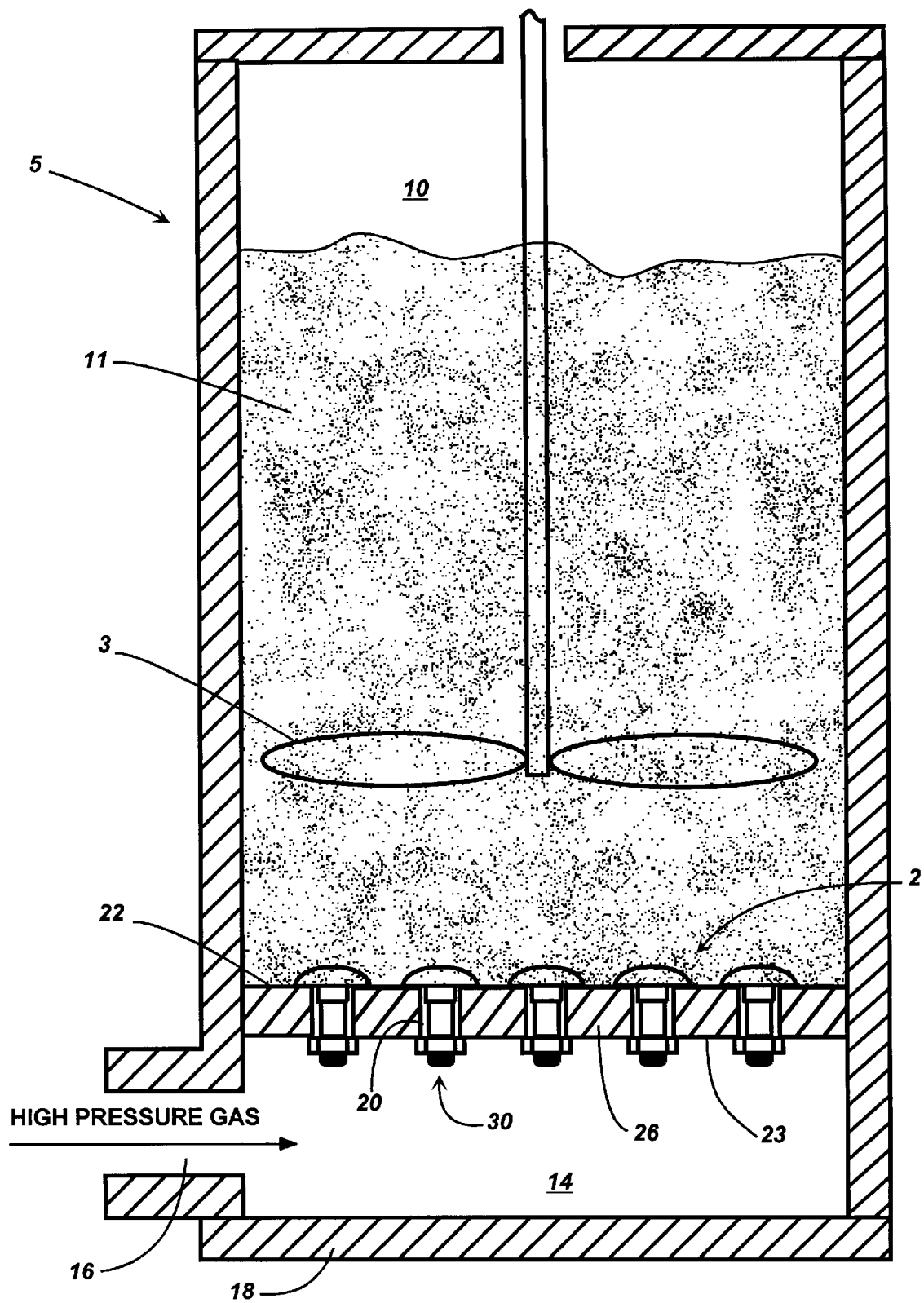
FIG. 1 is a cross-sectional illustration of the gas distributor in a vertical gas/solid fluidized bed reactor.

FIG. 1 is an illustration of an embodiment of the gas distributor 2 in a vertical gas/solid fluidized bed reactor 5.

The fluidized bed reactor 5 is separated by the gas distributor 2 into two chambers. Above the gas distributor 2 is a fluidizing chamber 10 which contains the particulate solid 11 during fluidization. The fluidizing chamber 10 may also contain an agitator 3 to aid mixing of the particulate solid 11. Beneath the gas distributor 2 is a plenum chamber 14 for receiving a pressurized gas. Plenum chamber 14 has at least one port 16 connected to a source of pressurized gas and an access panel 18 to permit adjustment of the carriage bolt assemblies 30. The gas distributor 2 is disposed horizontally between the fluidizing chamber 10 and the plenum chamber 14. The pressurized gas in the plenum chamber 14 passes through the openings 20 and into the fluidizing chamber 10. Openings 20 have substantially square cross-sections and are punched or drilled through plate 26. The particulate solid 11 contacts the upward face 22 of plate 26 and the downward face 23 of plate 26 is in contact with the pressurized gas in the plenum chamber 14. Plate 26 is constructed to have sufficient strength to support the weight of the particulate solid in the fluidizing chamber at the internal pressure and temperature of the fluidizing chamber. The carriage bolt assemblies 30 are used to regulate the gas flow through openings 20 while preventing particulate material from falling into the plenum chamber 14. Regulation of the gas flow through the openings 20 affects the degree of fluidization of the particulate solid 11 in the fluidizing chamber 10.

Figure 2:
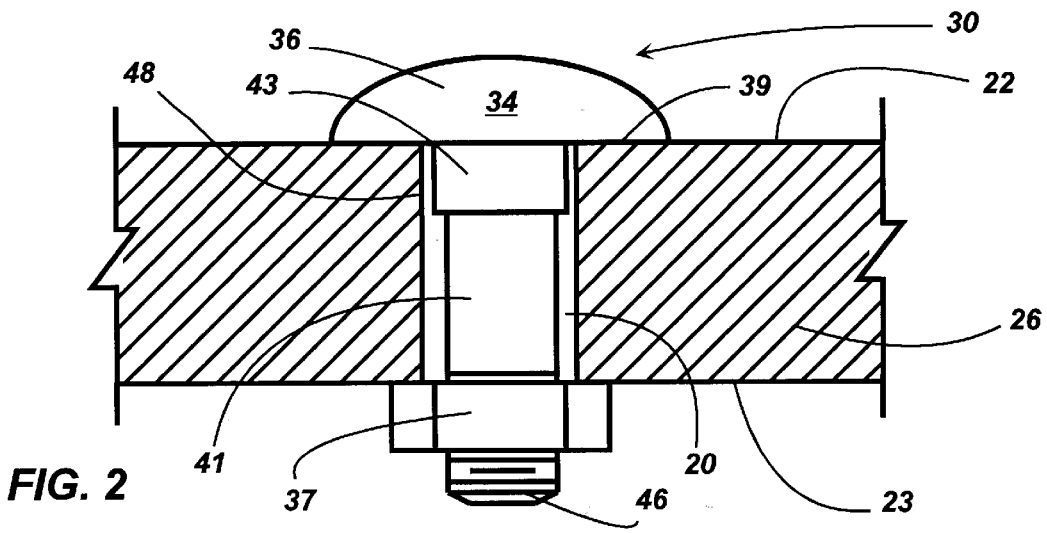
FIG. 2 is a partial cross-sectional view of the gas distributor showing a bolt assembly in a tightened position.

FIG. 2 is an expanded cross-sectional view of one of the openings 20 of the gas distributor showing carriage bolt assembly 30. The carriage bolt assembly 30 is axially positionable within opening 20 to permit more or less gas flow through the opening. Gas flow adjustment is achieved by either loosening or tightening nut 37. Carriage bolt 34 is oriented within opening 20 so that the mating surface 39 of rounded head 36 contacts the upward face 22 of plate 26 and the threaded end 46 extends beyond the downward face 23 of plate 26. The retaining shoulder 43 of carriage bolt 34 which is proximate to head 36 has a substantially square cross-section and extends axially and outwardly from shaft 41. The retaining shoulder 43 engages the complementary surfaces 48 of opening 20 to inhibit axial rotation of the carriage bolt 34.

Figure 3A:
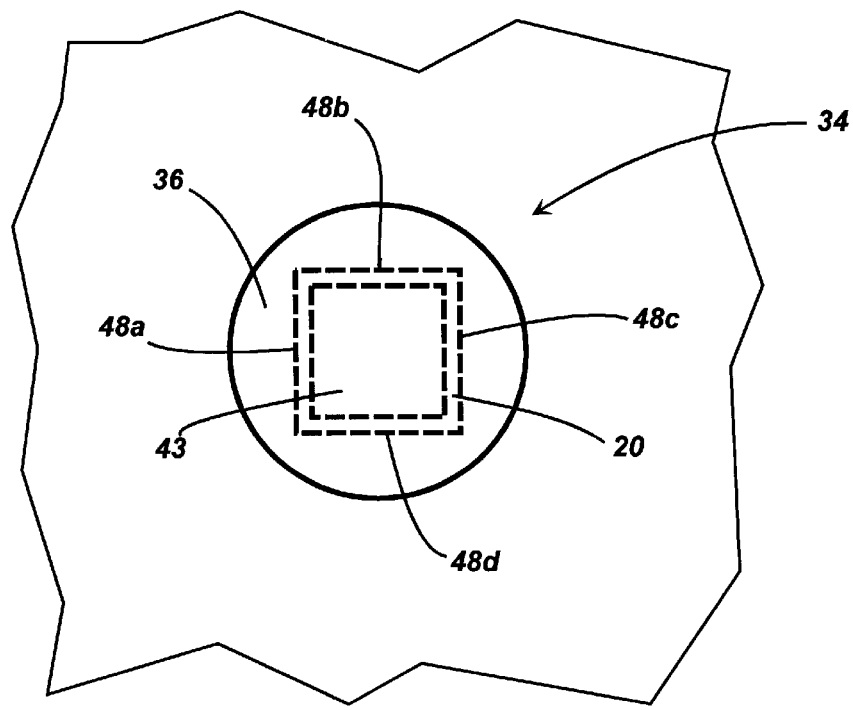
FIG. 3A is a partial top view of the gas distributor showing the position of a bolt assembly in an opening.
Figure 3B:
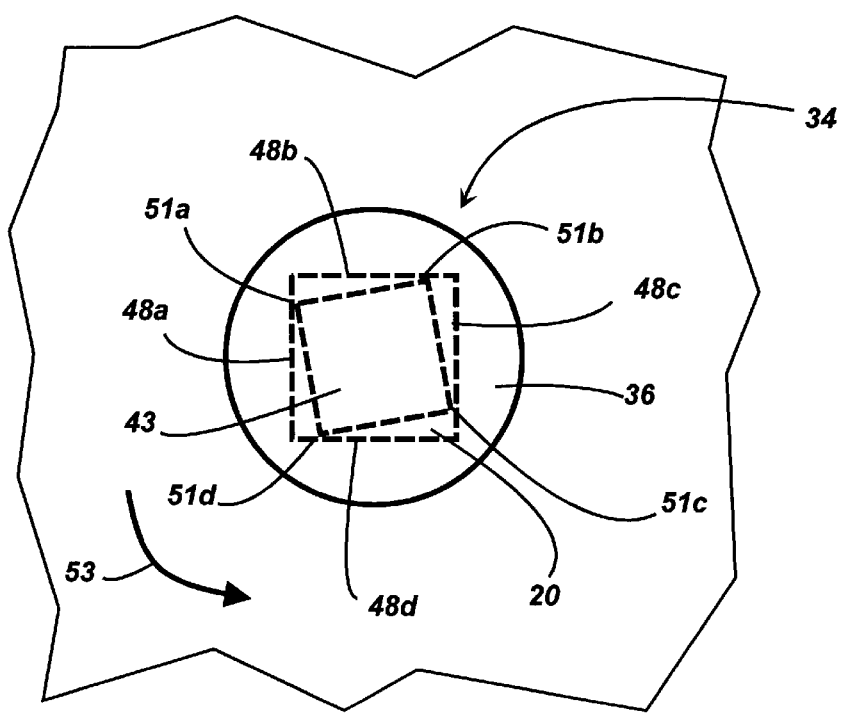
FIG. 3B is the same view as FIG. 3A wherein the bolt has been rotated slightly.

The interaction and relationship of the retaining shoulder 43 and the opening 20 is better viewed in FIGS. 3A and 3B which are partial top views of the gas distributor. In FIG. 3A, the complementary surfaces 48a, 48b, 48c, and 48d of opening 20 are spaced apart from the retaining shoulder 43 of carriage bolt 34 to permit gas to flow therebetween. The width of opening 20 should be large enough to permit axial translation of the carriage bolt within the opening but not so large as to permit axial rotation of the carriage bolt by more than 45°. The diameter of head 36 should be sufficiently large so that the head 36 can completely occlude opening 20 to prevent particulate material from falling through the opening 20 into the plenum chamber. In FIG. 3B, carriage bolt 34 has been rotated slightly in the direction shown by arrow 53. Retaining shoulder 43 has contacted the complementary surfaces 48a, 48b, 48c and 48d, of opening 20 at points 51a, 51b, 51c, and 51d, thereby preventing further rotation of carriage bolt 34. While the cross-sections of the retaining shoulder and opening are substantially square in this embodiment, other embodiments having non-circular cross-sections which inhibit rotation of the bolt can also be used.

Referring again to FIG. 2, carriage bolt assembly 30 is shown in its tightened position. The mating surface 39 of the head 36 is in contact with the upward face 22 of plate 26 and nut 37 is in contact with the downward face 23 of plate 26. In this position, no axial translation of the carriage bolt assembly 30 can occur. However, neither the seal formed between the mating surface 39 of head 36 and the upward face of the plate nor the seal formed between nut 37 and the downward face 23 of plate 26 is gas-tight. Thus, the pressurized gas in the plenum chamber can still pass through opening 20 into the fluidizing chamber.

Figure 4:
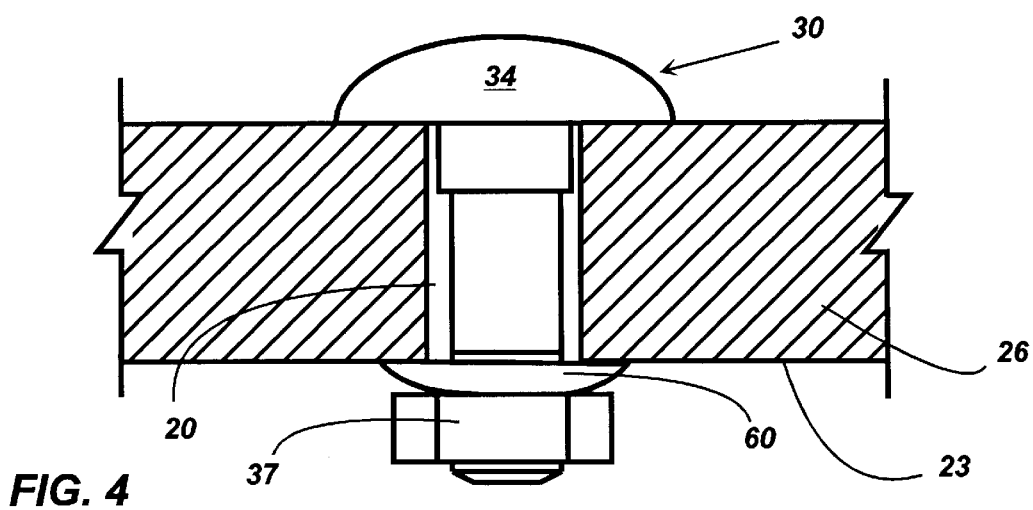
FIG. 4 is a partial cross-sectional view of the gas distributor showing another bolt assembly configuration.

In the embodiment shown in FIG. 4, a lock washer 60 (a Belleville type is shown here) has been interposed between nut 37 and the downward face 23 of plate 26 to prevent carriage bolt 34 from becoming loose during operation of the fluidized bed. The lock washer 60 also serves to aid in the regulation of the flow of gas through opening 20. Other lock washer configurations could also be used. For example, "star" type lock washers could be used above and/or below plate 26 to prevent carriage bolt 34 from loosening while at the same time aiding gas regulation.

Figure 5:
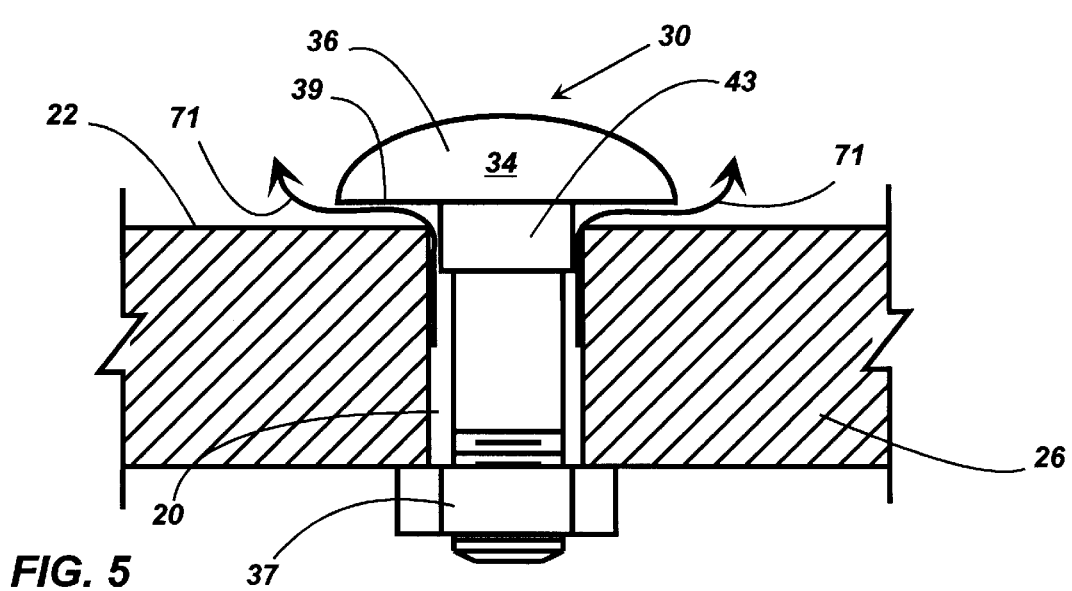
FIG. 5 is a partial cross-sectional view of the gas distributor showing a bolt assembly in a loosened position.

In FIG. 5, carriage bolt assembly 30 has been loosened to permit axial translation of the carriage bolt assembly in opening 20. As shown in FIG. 5, the high pressure gas 71 from the plenum chamber passes through opening 20 and is directed horizontally along the upward face 22 of plate 26 by the mating surface 39 of head 36. The force being applied to the mating surface 39 by the gas causes carriage bolt 34 to rise up off the upward face 22 of plate 26. Nut 37 prevents carriage bolt 34 from being ejected from opening 20. Nut 37 is adjusted so that at least a portion of the retaining shoulder 43 of carriage bolt 34 remains within opening 20 so that carriage bolt 34 will seat properly once the gas pressure is reduced. Nut 27 may be a single lock nut or may consist of two nuts tightened against each other in order to prevent loosening or tightening of the bolt assembly 30 during operation.

While there has been shown and described what are at the present considered the preferred embodiments of the invention, it will be obvious to those skilled in the art that various changes and modifications may be made therein without departing from the scope of the invention as defined by the appended claims.

I claim:
1. A gas distributor for a vertical gas/solid fluidized bed reactor, said fluidized bed reactor having a fluidizing chamber for fluidizing particulate solids and a plenum chamber for receiving a pressurized gas, said gas distributor comprising: a plate having at least one opening therethrough, an upward face in contact with said fluidizing chamber and a downward face in contact with said plenum chamber, said plate being horizontally disposed between said fluidizing chamber and said plenum chamber; and an axially positionable bolt assembly situated in each opening, said bolt assembly comprising a bolt and a fastener, said bolt having a head, a threaded shaft and a retaining shoulder, said head protruding into said fluidizing chamber and being wide enough to occlude said opening, said retaining shoulder being proximate to said head and extending axially and outwardly from said shaft, said threaded shaft protruding into said plenum chamber, said fastener being connected to said threaded shaft for engaging the downward face of said plate; and, each opening having complementary surfaces for contacting said retaining shoulder to inhibit axial rotation of said bolt, said complementary surfaces being spaced apart from said shoulder to permit gas to flow therebetween and to allow axial translation of said bolt assembly.

2. The gas distributor of claim 1 wherein the head of the bolt assembly is rounded.

3. The gas distributor of claim 1 wherein the retaining shoulder and the opening have substantially square cross-sections.

4. The gas distributor of claim 1 further comprising a lock washer disposed between the fastener and the downward face of the plate.

5. The gas distributor of claim 1 further comprising a second lock washer disposed between the head of the bolt and the upward face of the plate.

6. The gas distributor of claim 1 wherein the plenum chamber has an access panel to permit adjusting of the bolt assemblies.

7. The gas distributor of claim 3 wherein the bolt assembly comprises a carriage bolt and nut.

* * * * *